(12) United States Patent
Givoletti

(10) Patent No.: US 7,234,853 B2
(45) Date of Patent: Jun. 26, 2007

(54) TEXTILE PRODUCT WITH ILLUMINATED FIBERS MANUFACTURING PROCESS

(75) Inventor: Marcello Givoletti, Camaiore (IT)

(73) Assignee: Luminex S.p.A., Prato (IT)

( * ) Notice: Subject to any disclaimer, the term of this patent is extended or adjusted under 35 U.S.C. 154(b) by 0 days.

(21) Appl. No.: 10/344,143

(22) PCT Filed: Aug. 3, 2001

(86) PCT No.: PCT/EP01/09006

§ 371 (c)(1),
(2), (4) Date: Apr. 2, 2003

(87) PCT Pub. No.: WO02/12785

PCT Pub. Date: Feb. 14, 2002

(65) Prior Publication Data

US 2003/0156426 A1    Aug. 21, 2003

(30) Foreign Application Priority Data

Aug. 7, 2000 (IT) .............................. FI2000A0177

(51) Int. Cl.
*D03D 15/00* (2006.01)

(52) U.S. Cl. ............ 362/556; 362/551; 362/570; 385/115; 385/147

(58) Field of Classification Search .............. 362/31, 362/551, 554–556, 570, 103, 105–108, 800, 362/806, 812; 385/15, 31, 39, 53, 54, 80, 385/76–78, 81, 84, 88, 115, 120, 123, 134, 385/138, 139, 147
See application file for complete search history.

(56) References Cited

U.S. PATENT DOCUMENTS

| | | | | |
|---|---|---|---|---|
| 4,234,907 A | * | 11/1980 | Daniel | 362/556 |
| 4,422,719 A | * | 12/1983 | Orcutt | 362/582 |
| 4,466,697 A | * | 8/1984 | Daniel | 385/123 |
| 5,027,259 A | * | 6/1991 | Chujko | 362/582 |
| 5,099,399 A | * | 3/1992 | Miller et al. | 362/580 |
| 5,183,323 A | * | 2/1993 | Daniel | 362/556 |
| 5,568,964 A | * | 10/1996 | Parker et al. | 362/556 |
| 5,631,994 A | * | 5/1997 | Appeldorn et al. | 385/123 |
| 5,905,826 A | * | 5/1999 | Benson et al. | 362/554 |
| 6,072,619 A | * | 6/2000 | Kiryuschev et al. | 359/252 |
| 6,201,915 B1 | * | 3/2001 | Rizkin et al. | 362/554 |
| 6,480,649 B2 | * | 11/2002 | Lee | 385/31 |
| 6,628,885 B1 | * | 9/2003 | Wilkie et al. | 362/554 |

FOREIGN PATENT DOCUMENTS

| | | |
|---|---|---|
| GB | 2305848 | 4/1997 |
| WO | WO 00/32962 | 8/2000 |
| WO | WO 00/61991 | 10/2000 |

* cited by examiner

*Primary Examiner*—Jong Suk Lee
*Assistant Examiner*—Ismael Negron
(74) *Attorney, Agent, or Firm*—McCormick, Paulding & Huber LLP

(57) ABSTRACT

Textile product comprising light guiding fibres (2) consisting of a central core capable of transmitting the light and of an external sheath, in which at least a length portion of said external sheath presents, in respect to the internal core, a refraction index allowing the transmitted light to partially escape from the fibre; cloth article made from the textile product; and a manufacturing method of the textile product.

11 Claims, 4 Drawing Sheets

Figure 1:
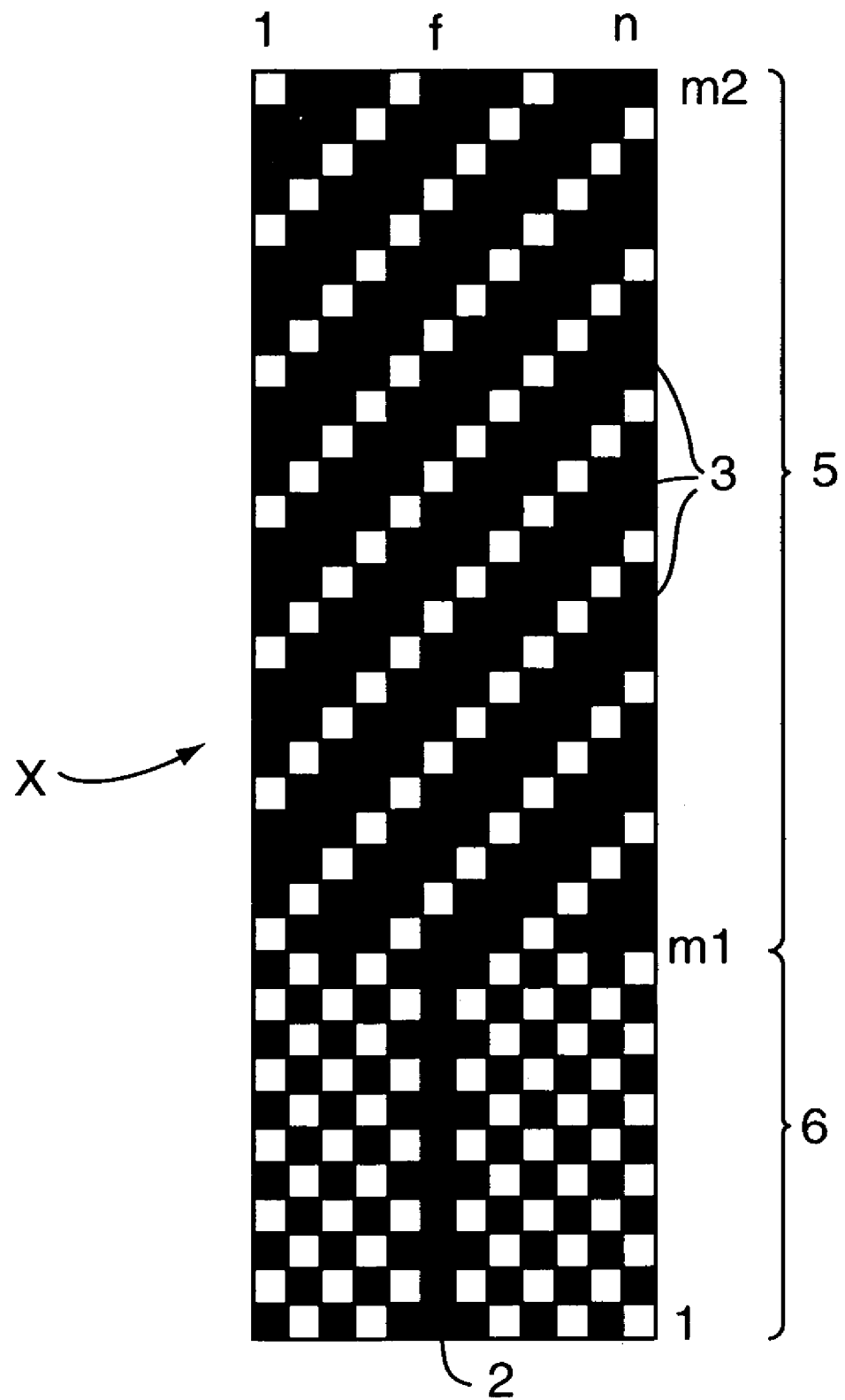

TEXTILE PRODUCT WITH ILLUMINATED FIBERS MANUFACTURING PROCESS

CROSS-REFERENCE TO RELATED APPLICATIONS

This application is entitled to the benefit of and incorporates by reference in their entireties essential subject matter disclosed in International Application No. PCT/EP01/09006 filed on Aug. 3, 2001 and Italian Patent Application No. FI2000A000177 filed on Aug. 7, 2000.

FIELD OF THE INVENTION

The present invention refers to a fabric or other textile product incorporating "illuminated fibres" and to an article made by the textile product and provided with a light source supplied by an electric battery capable to be housed in a suitable pocket of the article itself.

The invention further refers to a method for the industrial manufacturing of the fabric through a traditional loom.

In the present document "illuminated fibres" indicate light ways made by filaments and/or optical fibres in plastic material, for example: PMMA (PolyMethylMethaAcrylate), PEA (PolyEthylAcrylate), PEMA (PolyEthylMethaAcrylate), PMMA/PEMA (PolyMethyl/PolyMethylAcrylate), PC (PolyCarbonate), PS (PolyStyrole), etc. . . .

STATE OF THE ART

At present description of fabrics containing fibres emitting light are already known, for example from the patent U.S. Pat. No. 4,234,907, even if till today, because of the impossibilities of carrying out any fabric with these characteristics, they have never been produced industrially.

The fabric of the mentioned document uses optical fibres illuminated at one end by a light source and provided with several notches of the cladding till the inner core permitting to the light to escape from the optical fibre to give the desired enlightening effect to the fabric.

Unfortunately, the fabric described in U.S. Pat. No. 4,234,907 presents several drawbacks:

a first problem is that most of the light, meeting the first notches in the optical fibres, will be dissipated making impossible to the light itself to reach the more distant notches without using very powerful and high consuming light sources and with big encumbrances.

A second problem, maybe the most invalidating one, is that these notches weaken the fibres making impossible the texture and further manufacturing (washing, friction, . . . )

A third problem is that, in order to gather the illuminating fibres, it is necessary to produce a fabric from which a sufficient fibre length extends out the fabric itself so that these fibres can be gathered in a bundle and connected to a light source. Anyway, by analysing the said document it is not described in what manner the result is obtained in an industrial suitable way.

It is well known that the "conventional" optical fibres used in U.S. Pat. No. 4,234,907 are constituted by a "core" and a "cladding" with a refractive index inferior to that one of the nucleus, in order to obtain internally a mirror effect determining the light propagation from one to the other end of a fibre, without dispersion in the intermediate areas.

AIM OF THE INVENTION

A first aim of the invention is to provide a fabric incorporating "enlightening fibres" and articles made from the fabric and capable to be manufactured in an easy and effective way.

In particular articles capable of being manufactured from the fabric of the invention are:
- cloth articles (trousers, jackets, skirts, overcoats, raincoats, mantels, shirts, sport garments, shoes, etc.);
- sport articles;
- accessories (bags, hats, ties, belts, foulards, gloves, umbrellas etc.);
- articles for the house (curtains, tents, moquette, coatings, pillows, covers), and for the car (upholstery);
- safety articles (garments for policemen and rescue operators, clothes for technicians, safety signals for cars, track tents, covering for cars, signalling bands etc.).

A second aim is to propose an industrially efficient method to produce the fabric.

SUMMARY OF THE INVENTION

These aims have been reached by a fabric, a cloth article made from the fabric and a method to manufacture industrially the fabric as characterised in the independent claims here attached.

Further features are contained in the secondary claims.

In particular, according to the invention, the desired effect of light dispersion inside the handmade is obtained by:

a) enlightening the optical fibres at the ends and exploiting the superficial modifications of the fibres caused by the texture and by other events (abrasions, micro-cracks, scratching, foldings of the surface) in order to modify locally the refractive index and permit the partial diffusion of the transmitted light.

b) addition of doping elements dissolved in the fibre itself and capable to absorb the light inside the fibre and re-emit it with a diffusion angle at 360° (sparkling and/or shifting light guides) so that the light is incident, at least partially, with an angle different from the limit angle and can therefore come out.

c) modifying appropriately the cladding refractive index in accordance to that of the central core of the optical fibres, so to disperse the light along the fibre length to be lighted, in order to change the light portion reflected by the cladding inside the core.

This refractive index will be chosen favourably in function of the handmade to be produced, of the length of the fibre to be lighted and of the light source features.

According to a further aspect of the invention, the reflective index of the illuminated fibres can be suitably modified by treating the fabric by a mechanical treatment like brushing or sanding, or by chemical reagent like:

aromatic and aliphatic hydrocarbons; organic acids, aliphatic alcohol; ketones; aldehydes; aromatic and aliphatic chlor derivatives; aromatic and aliphatic amines; amides; aromatic and aliphatic esters.

A suitable modification of the cladding of the fibres can be obtained treating the fabric by a laser beam of suitable energy which is able to destroy very localised portions of a fibre cladding without causing any damage to the rest of the fibre.

In this way we obtain a lighted fibre which reacts in a substantially different way from the conventional optical fibres.

LIST OF DRAWINGS

The advantages of the invention will be evident from the following description and from the annexed drawings, given as a non limiting example, in which:

FIG. 1 shows an example of the weave of a fabric according to the invention

Figure 2:
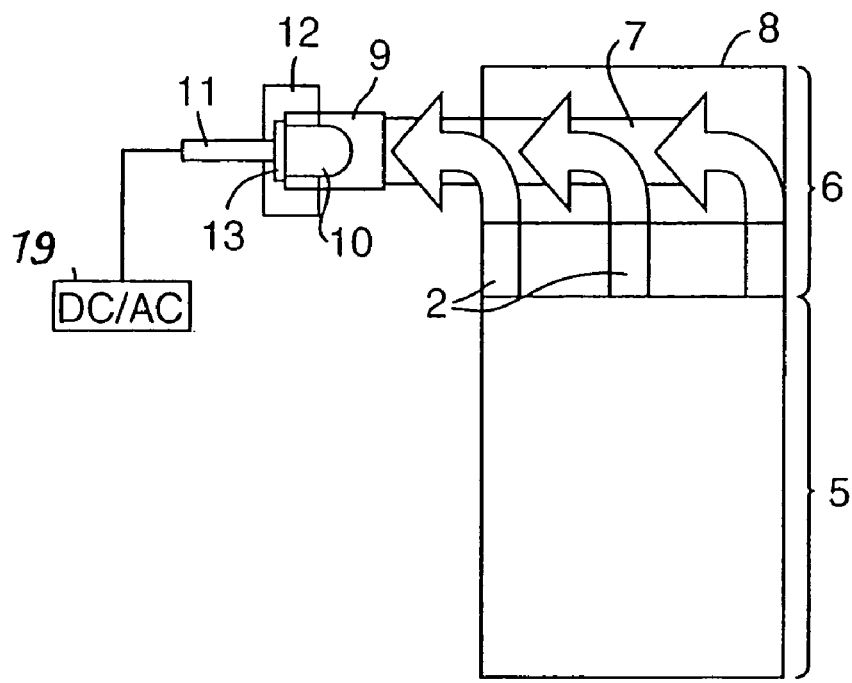
Figure 3:
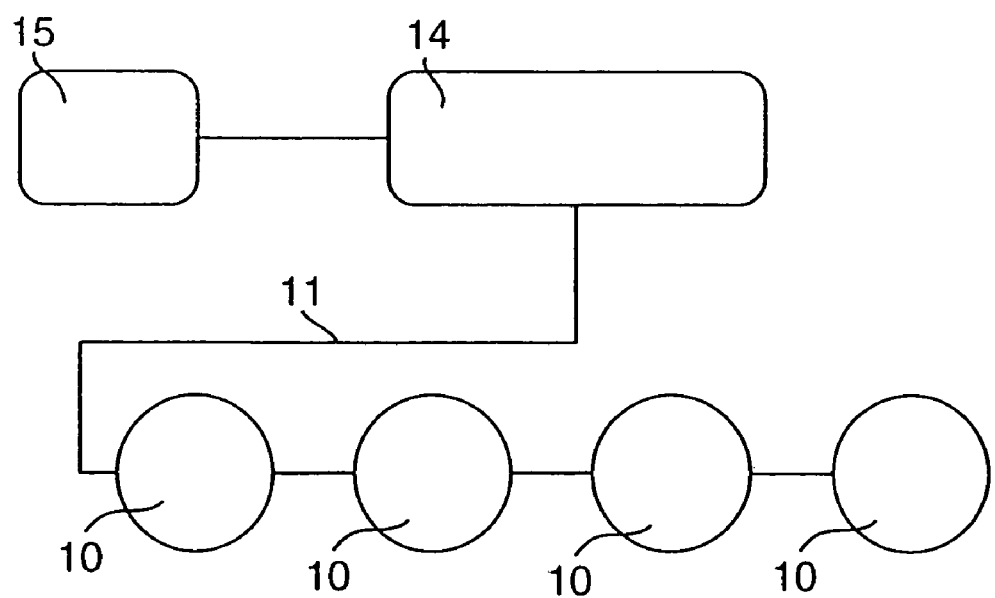
Figure 4A:
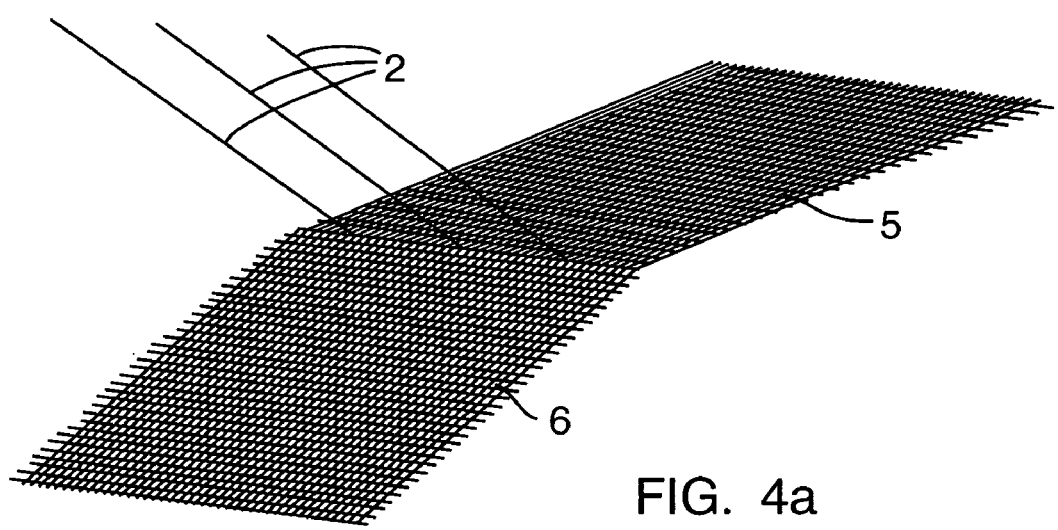
Figure 4B:
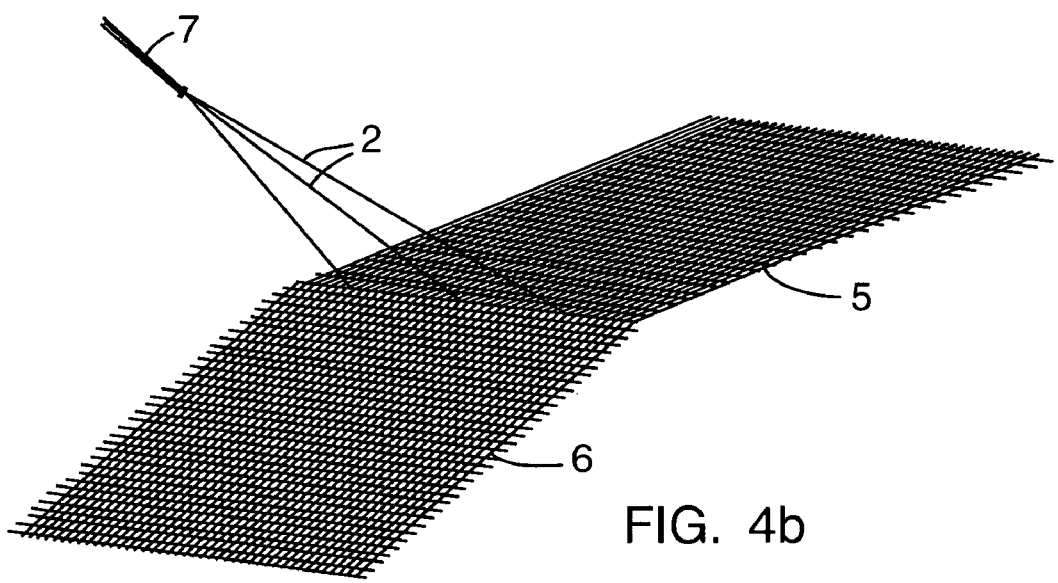
Figure 4C:
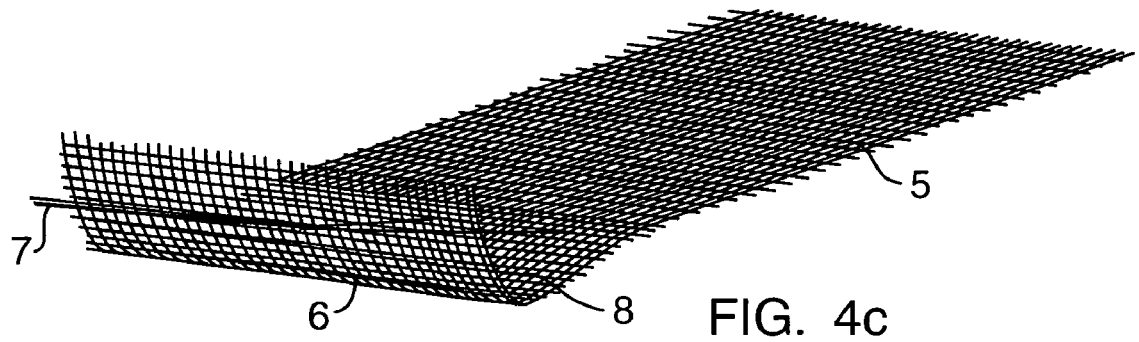
Figure 5:
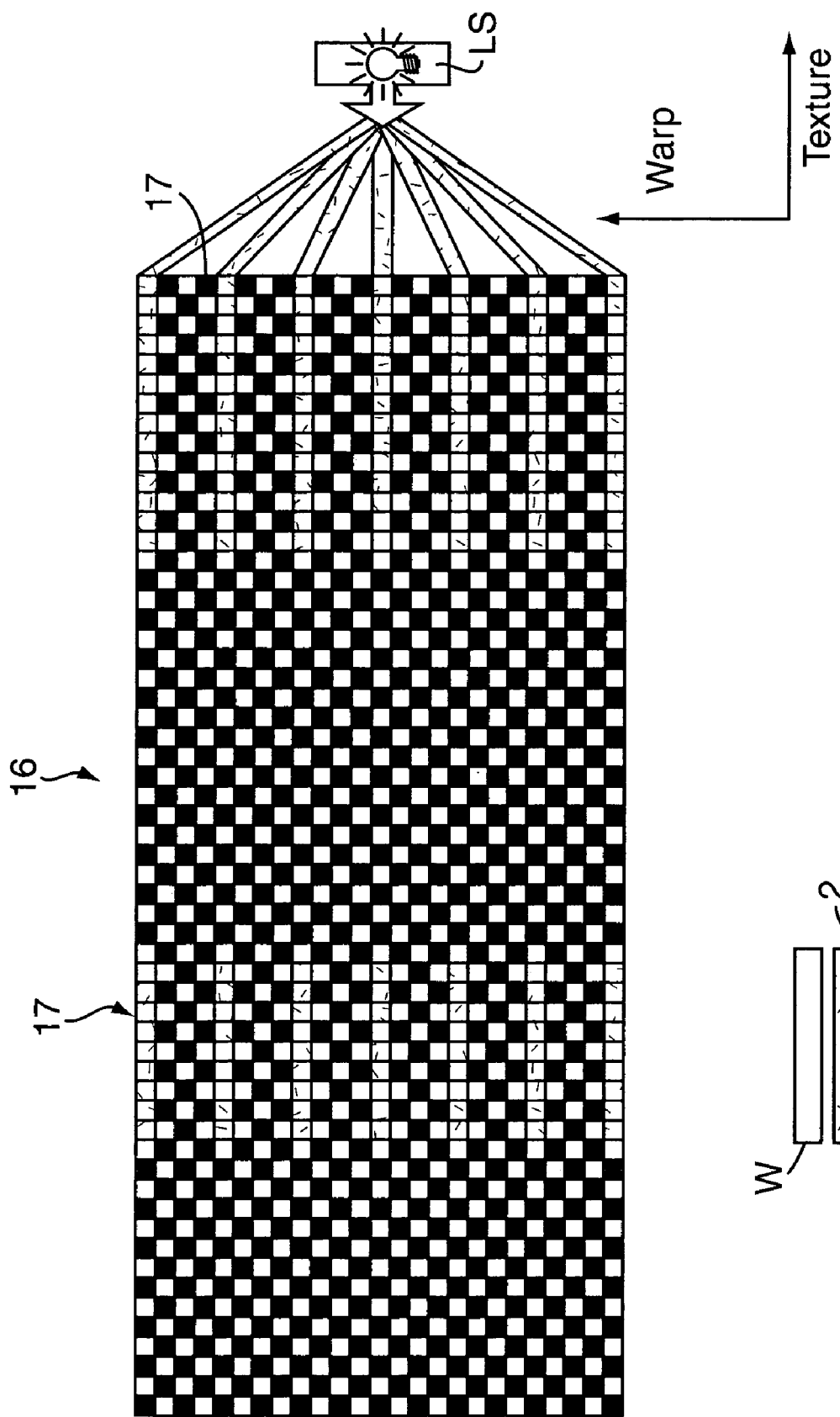

FIG. 2 schematically illustrates a piece of a cloth article manufactured from the fabric FIG. 3 schematically illustrates the connection means of the power supply with the light emitting fibres of the cloth article of the invention FIGS. 4a–4c show further stages of the production of a cloth article according to the invention;

FIG. 5 shows a scheme of a further embodiment of the textile fabric of the invention where light emitting fibres are arranged as texture threads.

DETAILED DESCRIPTION OF THE INVENTION

With reference to the drawings, in a preferred way of carrying out, the handmade of the invention consists in a fabric 1 in which a plurality of warp threads are constituted by sparkling (or, illuminated) fibres 2 spaced along the width of the texture X.

As illustrated by the weave scheme of FIG. 1, among the warp threads, only the fibres 2 are not interwoven by a suitable number m1 of texture threads 3. Depending on the predetermined number m1 of "loose" texture threads a predetermined length of the fibres 2 is kept free.

Advantageously, in this way it is possible to determine the needed length of the illuminated fibres which are to be gathered in bundles and closed at one extremity in order to be illuminated by a light source, as it will be better described hereinafter.

A further advantage is that the rest of the warp threads are normally interwoven by the texture threads, so that the fabric portion 6 having the free illuminated fibres 2 is not frayed but retained by the below portion of fabric and can be overlapped and sewed around the bundle of the illuminated fibres as shown in FIG. 4a–4c.

The resulting piece of fabric is then composed by a portion 5 where the illuminated fibres 2 are normally woven and at least a second portion 6 having at least one hem 8 inside which the bundle of illuminated fibres 2 can be housed.

With reference to FIG. 2 a cloth article according to the invention is manufactured from a piece of fabric obtained as described above.

The extremity of the bundle 7 outgoing from hem 8 is closed by a metal ring 9, or by an equivalent element, after that the fibres are cut (approximately with an angle of 90° in respect to their axis) in order to improve the optical coupling.

From the free extremity of the ring 9 a diode led 10 is inserted and firmly fixed so that it is optically coupled with the extremities of the fibres 2.

An electrical cable 11 is joined to the diode terminals (preferably welded) and juts out therefrom.

Preferably, the electrical junction 13 is protected by a resin filled cap 12 in order to protect the junction from possible stresses during the use of the cloth article by an user.

FIGS. 4a–4c schematically show the first production phases of the cloth article, with the junction in bundles of the free fibres 2 (FIG. 4a), the bundle disposition along the border of the woven portion of the handmade (FIG. 4b) and the carrying out of hem for the closing of the fibres bundle (FIG. 4c).

In a preferred way of carrying out, the illuminated fibres according to the invention consist in polymeric chemically doped optical fibres, also named sparkling fibres.

The doping components, for example, are constituted by aromatic polycyclic organic molecules with or without quinone, amine, cyanine, azoic groups which are present in the following compounds:

| POLYPHENYL COMPOUNDS | |
|---|---|
| methyl para-terphenyl | (DMT) |
| para-terphenyl | (PTP) |
| tetra methyl para-quaterphenyl | (TMQ) |
| di-methyl para-quaterphenyl | (BMQ) |
| etc. . . | |

| OXAZOLIC COMPOUNDS | |
|---|---|
| diphenyl-butylphenyl-oxadiazole | (BUTYL-PBD) |
| diphenyl-phenyl-oxadiazole | (PBD) |
| diphenyloxazole | (PPO) |
| etc. | |

Coumarinic Compounds
Hydroxymethylcoumarine
dimethylamino-trifluoromethyl-coumarine
benzothiazolyl-dietilamino-coumarine
etc.

Rhodaminic Compounds
diethylamino-diethylimino-benzoic acid
ethyamino-ethylimino-dimethyl-3H-xanthen-benzoic ethyl-ester Advantageously, the sparkling fibres are capable to receive the light both from the light source positioned at the end and from the light diffused in the environment though the intermediate woven portions of the fibres.

Depending on the doping additive used, the fibres emit light with a wave length preferably between 400 and 700 nm and more.

A further advantage of using sparkling fibres is that they are capable of transferring to the ends the light received along their whole length.

Thus, by exposing the fabric to a natural or artificial light, one or more LEDs placed at the end of the fibres will receive the light transmitted through the fibres and will generate an electric voltage. This electric voltage will then be applied to a DC-DC converter 17 and used to charge a battery.

Advantageously, when the fibres are "rubbed or scratched", we obtain, as described above, a superficial modification of the fibres which permits an increasing of the light emitted locally and it is so possible to "draw" figures on the fabric by using a small stick, a stone or other means.

FIG. 3 shows schematically a plurality of diodes 10 placed in parallel (any combination of parallel and series connections of diodes 10 can be used) and connected through electrical cables 11 to a DC converter 14 powered by an electric battery 15 that can be of replaceable or recharging type.

Preferably, the converter and the battery are packaged together in the same case in order to reduce the total dimensions.

Depending on the cloth article and on the desired aesthetic effect, one or more pieces of illuminated fabric will be used for the production of the cloth article.

Anyway, it is possible to produce pieces of fabric with a free length of the illuminated fibres wide enough to connect all the bundles to the same light source.

Preferably, the battery and DC converter case is housed in a suitable pocket of the cloth article, for example at the level of the trousers belt.

Alternatively it is possible that only the cables 11 outgo from the cloth article, ready to be connected to an external power supply group.

According to the invention, the description of a method to manufacture a fabric like that reported above follows here below.

With reference to FIG. 1, a number "n" of warp threads (black lines in figure) are arranged on a traditional loom (not illustrated in the figures) which are woven by the passages of the texture threads 3 (white line in FIG. 1) for the manufacture of a continuous fabric with a desired length.

A plurality of warp yarns consists of fibres f (for clearness sake, only one fibre is shown in the figure) with a ratio of weave preferably included between one out of four and one out of twelve, even if other ratios are possible going between one out of one or one out of any number.

In correspondence to the position f of fibres 2, the loom, which is preferably of the type electronically controlled, is ordered to keep the healds correspondent to fibres 2, lifted so that only the fibres 2 loose m1 passages of the texture yarn and remain free from the fabric 1 body which keeps its continuity.

After m1 passages, the loom is ordered to restore the normal condition and fibres 2 are woven again by the texture yarn for a number m2 of passages correspondent to the desired length of the fabric portion under production.

Advantageously, changing the number m1 it is easily possible to change the length of the fibres 2 free portion and this allow the producer to obtain bundles of illuminated fibres of the necessary length to produce the cloth article.

For example, if a free fibres length of 50 cm is necessary to manufacture the cloth article, a length of "lost" texture of 1 m will be left during the weaving in order to obtain two useful parts of fabric by cutting in the middle the height of the "lost" texture.

According to the invention, if during the weaving the illuminated fibres 2 present a different behaviour from the other warp threads (for example because of a different flexibility or different mechanical properties) some means to control the mechanical tension of the supplied fibres can be provided, to avoid any failure of the loom during the fabric manufacturing.

For example, these mechanical tension control means can be constituted by traditional or additional warp beams for the power supply of the enlightening fibres which rotate under the control of an independent engine with electronic and/or mechanical control of the mechanical tension.

FIG. 5 shows a semifinished product consisting of a fabric piece 16 according to the invention in which the illuminated fibres 2 are arranged as texture threads.

In this case, the fibers 2 can be interlaced only by a number of selected warp threads, so that portions of a predetermined length of fibres 2 can be kept free from the fabric piece.

Advantageously, these free portions can be arranged either at the ends of the fabric (portion P1 in FIG. 5) or at any intermediate position (portion P2) of FIG. 5.

As a further advantage, it has to be noted that each fibre 2 can present a different position of its interlaced and free portions, so that substantially any figure or drawings can be obtained by composing a proper distribution of illuminated fibre portions emerging from the fabric.

In more detail, FIG. 5 schematically shows a fabric piece made from warp threads W, texture threads T and illuminated texture fibres 2.

Advantageously, as a result of the invention the fabric piece 16 can be cut with a prefixed height H and the free end portions of the fibres 2 can be gathered in a bundle to be easily joined with a light source LS when the fabric piece has to be used to manufacture a finished article.

According to a further advantage of the invention, at least a part of the fibres 2 are not adjacent each to the other, so that the fabric parts 17 underlying the free portions of the fibres 2 can maintain a substantial continuity and can serve, for example, as a protection sheet for the handling of the same fabric piece 16.

The present invention has been described with reference to preferred ways of carrying out. Equivalent modifications can be performed without outgoing from the scope of the present invention.

The invention claimed is:

1. A textile product comprising light guiding fibers (2) consisting of a fabric made of texture threads and warp threads wherein at least a number of non adjacent warp or texture threads consist of said light guiding fibers and at least one free length portion of said light guiding fibers (2) is not interwoven with a corresponding underlying portion (6,17) of fabric and said free length portions are gathered in a bundle (7) contained inside a hem (8) which is obtained by folding the fabric piece underlying the free portion of fibers (2).

2. The textile product according to claim 1 wherein said light guiding fibers (2) are consisting of a central core capable of transmitting light and of an external sheath, characterized in that said sheath is constituted by superficial modified regions of the same fibers by treatment with a chemical agent selected from: aromatic and aliphatic hydrocarbons, organic acids aliphatic alcohol, ketones, aldehydes, aromatic and aliphatic chlorine derivatives; aromatic and aliphatic amines, amides, aromatic and aliphatic esters or by treatment with laser beam.

3. The textile product according to claim 1 wherein said light guiding fibers (2) are arranged as warp yarns of the fabric.

4. The textile product according to claim 1 wherein said light guiding fibers (2) are arranged as texture yarns of the fabric.

5. The textile product according to claim 1 comprising at least one light source (10, LS) optically coupled with a free end of said fibers (2).

6. The textile product according to claim 5 wherein said source light consist of LED diode (10) securely fixed to one end of said bundle (7) by a metal ring (9) and connected through cables (11) to a power unit constituted by a battery pack and a DC/AC converter.

7. The textile according to claim 6 wherein the junction between diode (10) and fibers (2) is protected by a cap (12).

8. The textile according to claim 6 wherein said power unit is housed in a pocket of the article.

9. A process for manufacturing a textile by a textile loom, said method comprising the steps of:

selection of a plurality of light guiding fibers (f);

arranging of said light guiding fibers (f) as non adjacent warp or texture yarns;

weaving of a first piece (5) of fabric;

weaving of at least one piece of fabric (6) in which only said light guiding fibers (f) are not interwoven by the texture or warp yarns;

cutting the fabric through said fabric piece (6), possibly in an intermediate position thereof, so that the light guiding fibers (f) are cut and made free from the correspondent underlying fabric portion; and gathering said light guiding fibers (f) made free from the correspondent underlying fabric portion in a bundle contained inside a hem obtained by folding said underlying fabric portion.

10. The process according to claim 9 wherein fibers (f) are arranged as warp yarns supplied by tension control means.

11. The process according to claim 9 wherein said tension control is obtained by an autonomous motorization of the beams supplying fibers (f).

* * * * *